(12) United States Patent
Eren

(10) Patent No.: US 12,658,075 B2
(45) Date of Patent: Jun. 16, 2026

(54) OUTPUT PREPARING METHOD USED IN PRODUCING LAYER CATALOGUE OF GEOSTAMPS IN THE ATLAS FORMAT

(71) Applicant: Sirin Gülcen Eren, Isparta (AR)

(72) Inventor: Sirin Gülcen Eren, Isparta (AR)

( * ) Notice: Subject to any disclaimer, the term of this patent is extended or adjusted under 35 U.S.C. 154(b) by 1048 days.

(21) Appl. No.: 17/776,840

(22) PCT Filed: Nov. 10, 2020

(86) PCT No.: PCT/TR2020/051081
§ 371 (c)(1),
(2) Date: May 13, 2022

(87) PCT Pub. No.: WO2021/096468
PCT Pub. Date: May 20, 2021

(65) Prior Publication Data
US 2023/0360563 A1     Nov. 9, 2023

(30) Foreign Application Priority Data

Nov. 14, 2019   (TR) .................................. 2019/17790

(51) Int. Cl.
*G09B 29/00*      (2006.01)
*G06T 11/20*      (2026.01)
(52) U.S. Cl.
CPC ............. *G09B 29/004* (2013.01); *G06T 11/20* (2013.01)
(58) Field of Classification Search
CPC ........ G09B 29/004; G06T 11/20; G06F 16/29
See application file for complete search history.

(56) References Cited

U.S. PATENT DOCUMENTS

2010/0017733 A1*   1/2010   Barros .................. G06F 3/0482
                                                              715/810
2010/0088014 A1    4/2010   Carandini et al.
2018/0211427 A1*   7/2018   Andrew .................. G06T 11/00

FOREIGN PATENT DOCUMENTS

RU          2506610 C1    2/2014

OTHER PUBLICATIONS

ESRI: ArcGIS 9 Getting Started With ArcGIS [online] [Retrieved Aug. 5, 2025] <URL: https://content.esri.com/support/documentation/ao_/1003getting_started_with_arcgis.pdf> (Year: 2005).*
Birdseye: The reproduction of maps drawn on acetate sheets [online] [Retrieved Aug. 12, 2025] <URL: https://www.asprs.org/wp-content/uploads/pers/1936journal/sep/1936_sep_24-28.pdf> (Year: 1936).*
(Continued)

*Primary Examiner* — King Y Poon
*Assistant Examiner* — Vincent Alexander Providence
(74) *Attorney, Agent, or Firm* — EGBERT, MCDANIEL & SWARTZ, PLLC

(57)          ABSTRACT

Disclosed is a method, wherein the layer catalog output is produced in the atlas format by performing a negative mapping of the earth's surface on the basis of land cadastral parcels and geographical structure, defining the maximum number of geostamp motifs and patterns drawn by using the pictogram method, and determining the layers, on which geostamps and motif patterns are presented, and the layers are delaminated.

16 Claims, 7 Drawing Sheets

(56) References Cited

OTHER PUBLICATIONS

Boals: Planning for Scanning: File Sizes [online] [Retrieved Aug. 12, 2025] <URL: https://web.archive.org/web/20141123061130/https://informdecisions.com/planning-scanning-file-sizes/> (Year: 2014).*

Keane: 3D Printing Simulation, Part 1: Where Are We Now? [online] [Retrieved Aug. 6, 2025] <URL: https://www.engineering.com/3d-printing-simulation-part-1-where-are-we-now/> (Year: 2018).*

Sanchez: The Elements and Principles of Design [online] [Retrieved Aug. 5, 2025] <URL: https://medialoot.com/blog/the-elements-and-principles-of-design/> (Year: 2017).*

Eren: Ancient Smart Cadastrate: Akarçay Tepe Scaled-Cadastral Map [online] [Retrieved Aug. 5, 2025] <URL: https://www.academia.edu/37161184/Ancient_Smart_Cadastrate_Akar%C3%A7ay_Tepe_Scaled_Cadastral_Map> (Year: 2018).*

International Search Report for corresponding PCT/TR2020/051081, dated Feb. 5, 2021.

Written Opinion of the International Searching Authority for corresponding PCT/TR2020/051081, dated Feb. 5, 2021.

Longley P A et al, "GIS Software", Geographic Information Systems and Science, XX, XX,Jan. 1, 2005 (Jan. 1, 2005), p. 157-197, XP002458898 (Relevant Pages Provided).

International Preliminary Report on Patentability for corresponding PCT/TR2020/051081, dated Feb. 14, 2022.

* cited by examiner

OUTPUT PREPARING METHOD USED IN PRODUCING LAYER CATALOGUE OF GEOSTAMPS IN THE ATLAS FORMAT

TECHNICAL FIELD

The present invention relates to a method, wherein the layer catalog output in the atlas format is produced by means of performing a negative mapping of the earth's surface on the basis of land cadastral parcels and geographical structure, defining the maximum number of geostamp motifs and patterns drawn by using the pictogram method, and determining the layers, on which geostamps and motif patterns are presented, and the layers are delaminated.

PRIOR ART

Since the early communities started to experience sedentary way of life, "land property" emerged as a result of ownership, use, operation, and possession rights on land. Civilizations have determined social relations on the basis of these rights and fair living, land order, and social order were ensured. Various methods were implemented, and certain tools have been developed for the society to reach a mutual agreement in terms of defining property rights, registering these, informing the society on the registry, and transferring these rights.

Geostamps (stamps) and their layers are one of the administrative tools used by Hatti, Hittite, Phrygian, Tabal, Persian, Hellenistic, Roman lands and by other ancient civilizations. Geostamps have preserved their existence up until today as one of the current mysteries of humankind. Furthermore, in the ancient civilizations, the geostamps are the land registries drawn on land by the pictogram method by way of forming cadastral parcels and shaping the geographical structure (FIG. 1, 2, 3) comprising spatial reference and data. Geostamps implemented in a widespread geography have shaped agricultural parcels as well as the settlement and road systems.

Geostamps and their layers are a spatial network systematic, wherein civilizations in a certain geography have defined their historical experiences, sanctities, beliefs, myths, customs, gods, and dominant rulers by means of cadastral parcel lines by using natural structure through motifs, patterns, and compositions on land. Civilizations have described their histories by stamps aligned in separate layers. Stamp themes also define the borders of geography under domination or a settlement. The creation of visual effect and achievement of eternity of the creator are among other objectives of creation.

Every civilization has created its own geostamps with different base directions, reference, scale, angle and ratios, and drawing and design principle, technic and detail differences. Geostamp motifs are formed through the pictographic shaping of cadastral parcel boundary lines in order to create a certain shape and the combination of motifs constitutes patterns and compositions. Civilizations implemented their motifs and patterns by using a different origin, triangulation point, polygon, and drawing reference detail on the land (FIG. 4) which is the base. Civilizations enlarged the same motif thereon or drew a different figure directionally and angularly or constituted a pattern or composition change. Figures of motifs touch each other.

Archeology, architecture, city planning, geophysics, settlement archeology, geoarchaeology, cartography, and historical geography disciplines are used to reveal which civilizations had lived in a certain geography and what their history is. Domination areas of these civilizations, human settlement areas, and geographical boundaries as well as periods of architectural ruins are studied through various methods. Archive search, oral history search, surface exploration, field research, excavations, measurements, laboratory tests, stratigraphy, development of software and technical tools, geophysical tests, and drillings compose some of these methods of analysis.

Related disciplines employ various methods to determine which civilizations had lived in a certain geography and their history. Prior to the use of modern technology, settlement traces, architectural ruins, findings, and artifacts under an earth mass in a certain land are revealed as a result of field research and excavations that last for years and performed costly and with financial restrictions under troublesome conditions. In addition, scientists of the aforementioned disciplines make dating by predicting civilizations and their periods of stay in a certain area through the analysis of findings and artifacts found in the area, cultural landscape elements, and/or spatial networks. Today, various technologies such as remote sensing and image processing methods for supporting said research and excavations have been developed. Archaeological findings, artifacts, and their locational determination can be precisely done and archived.

Research areas have expanded by the developments in computer programs and measuring methods, research periods are shortened, and different opportunities are offered as service to the discipline areas. Apart of the said programs and methods, ancient settlements' underground ruins and settlement boundaries can be detected, layered, or mapped, and interpreted periodically by means of digital or satellite imaging technologies such as ESRI, LIDAR, and LEICA, and various measuring devices. Furthermore, in the studies and researches on ancient settlements, the archaeological sites and ruins are processed through Geographical Information System (GIS) software and image processing methods. Use of said means provides plans of building and building complex and reduces the labor and research time required for excavations and research. 3-D presentations of settlements and buildings are also made by means of the said methods. In addition to these methods, images of the upper structure and underground building ruins and landscape elements in any area are achieved by balloon systems.

Such technologies and methods employed indicate what kind of interaction humankind has with the land and its landscape. Even though technologies allow various assumptions and determinations or can make simulations of such areas and buildings, they are limited in detecting the presence of a civilization in a geographical area, its existence period, and the dominance borders of its settlement area and precise and uninterrupted explanation of their civilization history covering experiences cannot be ensured. Furthermore, these technologies are used in exemplary applications providing data based on a set of comparisons within the scope of the determination of spatial transformations and historical development in the past. None of the technologies, methods, and products in the state of the art or prior art ensures a possibility to read geostamps by way of using land cadastral parcels and spatial reference and data, and further, there is no such use or a similar model example.

Therefore, at present, it is required solutions by means of detecting stamp motifs and patterns to drawbacks, and uncertainties on settlement dominance and farming area boundaries, hinterlands, road and trade routes apart from settlement sizes in studies conducted by the disciplines of historical geography, urban archeology, history, and archeology. Additionally, there is a need for novel methods that are cost-efficient and capable of defining history and land registers of civilizations in a briefer period of time and with fewer number of procedures than the technologies, products, and methods available in the state of the art. The present invention is able to fulfill this requirement.

Settlement archeology examines the settlement area and her buildings in a certain geographical area. The method used in this discipline area, which also comprises Geographical Information System (GIS) implementations, examines landscape elements and boundaries of a certain settlement or area. The discipline area also named Geoarchaeology does not perform a dating study over land cadaster data of the settlement area and its close surrounding and spatial references and data, on which the system to be realized is based upon. Spatial network studies of the discipline are based generally on the settlement, wherein the land defined in the method is not related to the cadastral network and it does not also have a respective method. Historical geography studies in the system to be realized are based on the spatial boundaries, relation, and networks.

At present, there is no method similar to the present invention, which ensures a solution for determining the maximum number of geostamps and the layers that contain these thereof over the land cadaster- and detects the past land cadaster. The methods, technologies, and products in the prior art is provided for a better understanding:

Electric prospecting [Electric prospecting, Zhurbin IV. Geophysics in archeology, Technologies, and results of the application.—Izhevsk: Udmurt Institute of History, Language and Literature, UrB RAS, 2004. P. 38-44], Georadar [DSKorobov. Fundamentals of Geoinformatics in Archaeology (+CD-ROM)-M.: MSU Publishing House, 2011. 224. p: Multiple Electrode System 2016-GE-203600] and seismic prospecting [seismic prospecting, DS Korobov] in the prior art are some of the various technics and technologies for dating the findings and artifacts. Mapping of the archaeological findings is performed by means of the method of the fundamentals of geoinformatics in archeology (The fundamentals of geoinformatics in archeology [+CD-ROM)-M.: MSU Publishing House, 2011. 224. p]). The disadvantages of these methods are that it is impossible to study the top layer, which is the basic demand of archaeologists.

Microscopic surveying in the prior art is the most applicable method in mapping the cultural layer. Said method may provide building plans under flood sediments [Dark. A. J. Seeing Beneath the Soil: Prospecting methods in archaeology.—London.: Batsford Ltd. 1990, 192p.]. This method only provides location and plans of the lost settlements and buildings. It is disadvantageous because of its use in high level magnetic and electromagnetic mixture, the complex procedure required for processing the obtained data and processing prolong the research period, unable to determine the period of all settlement and building layers and to use significantly expensive equipment.

In the method of the Russian patent document RU2506610 in the prior art, it is disclosed to ensure an effective research possibility in magnetic and electromagnetic fields by means of a granulometric and mineralogical analysis method built assuming that the increase in value of the magnetic sensitivity corresponds to the underground buildings and the decreasing value thereof corresponds to the interior gaps. Said method shortens the research period and also reduces mapping costs. The method further displays building ruins of the settlement area with similar physical-geographical and geological conditions.

Only the current underground buildings, settlement areas, geographical data, and land texture can be revealed by the implementation of the methods, namely archeological aerial thermography mapping with multispectral thermal cameras, UAV Documentation and Photographing with a remote-sensing method, UAV (unmanned aerial vehicle), Spectral Image Mapping, DJI Aerial Platform, Multi-Spectral Index Mapping and Drone Mapping which are used in the archaeological discipline area in the prior art.

Agisoft Photo Scan, another method in the prior art, is a software program that performs photogrammetric processes of the digital images (SCI539983, SCI574488, Historic Environment Scotland). Said program is used mostly in GIS applications of 3-D spatial data of generally the buildings, in documenting cultural heritage and in producing visual effect besides measuring indirectly objects in different scales.

In the US patent document US2010/0088014A1, it is disclosed a method that develops computer programs and processes for performing an archaeological mapping by navigation devices for detecting historical transformation based on the relation between the chronological historical periods of a geographical area and historical stages of the topography.

Methods in the prior art do not ensure a possibility for determining a historical dating or periods of the land order over the combination of the land cadaster and geographic data. Prior methods do not also comprise the capability of detecting geostamps and layers created by using pictograms on the land. Furthermore, the methods do not provide information and deduction on how long the civilizations were dominant in a certain area, administrative and settlement boundaries, and what they lived or their rulers, cultures, and beliefs. Therefore, there is a need for a solution that provides an output over measurable spatial references and offers motif shape and pictographic expression features.

BRIEF DESCRIPTION OF THE INVENTION

The object of the present invention is to realize a production method, the layer catalog output of which is in the atlas format, by means of performing a negative mapping of the earth's surface on the basis of land cadastral parcels and geographical structure, defining the maximum number of geostamp motifs and patterns drawn by using the pictogram method, and determining the layers, on which geostamps and motif patterns are presented, and the layers are delaminated.

Another object of the present invention is to realize a method, wherein land registers and histories of preferably the ancient civilizations having existed in a certain geographical area are determined based on the negatives of the earth's surface, geostamps, and layers that they have created.

Yet another object of the present invention is to realize a method, wherein it is revealed layers comprising a maximum number of geostamps (logographs) that they drew through the pictography method by means of shaping the cadastral parcels of the ancient civilizations having existed in a certain area and a novel epistemology is grounded.

Yet another object of the present invention is to realize a method, wherein it is detected the geography, in which a civilization once existed and how long they stayed there, it is determined their dominance and settlement boundaries and it is detected the landowners or users, beliefs, and myths thereof, by means of determining the morphology of the civilization.

Yet another object of the present invention is to realize a method, wherein it is offered alternative information that can be used in discipline area studies, and it is possible to subject the studies to comparative control.

DETAILED DESCRIPTION OF THE
INVENTION

Accompanying Figures illustrate study areas mentioned in "Output preparing method used in producing layer catalog of geostamps in the atlas format" realized so as to achieve objects of the present invention.

Explanations of terms used in the description are given below.

Figure 1:
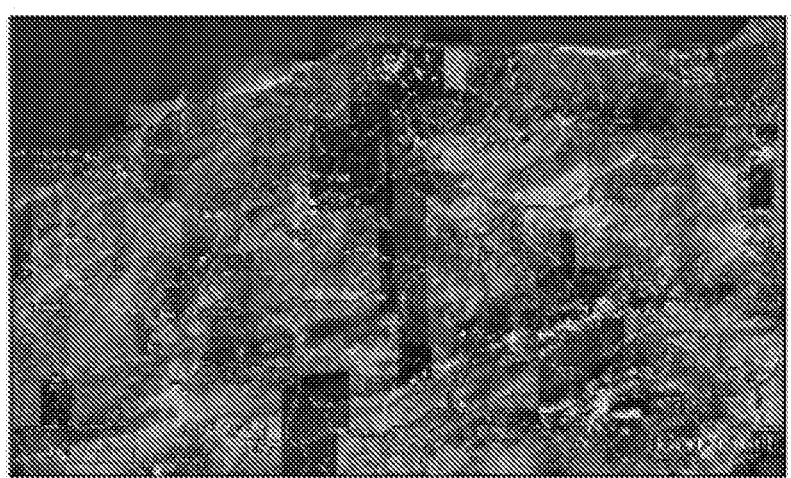
FIG. 1 illustrates the view of the geographical location of the study area achieved through using Google Earth or a different spatial display map or software.
Figure 2:
FIG. 2 illustrates the view of a land cadastral parcellation plan of the study area (Onaç Village, Çankiri, Turkey).
Figure 3:
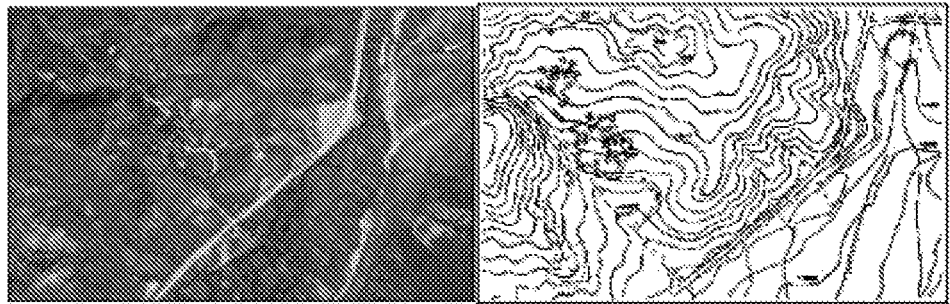
FIG. 3 illustrates the view of the geographical structure of the study area (Onaç Village, Çankiri, Turkey).
Figure 4:
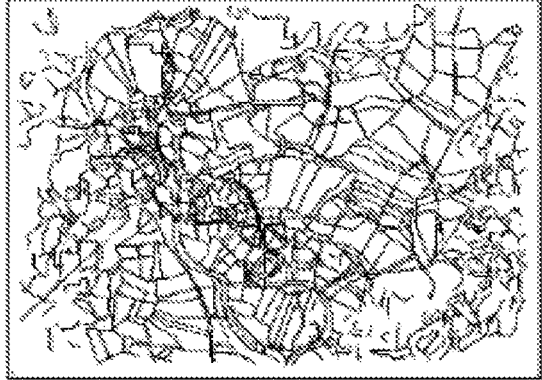
FIG. 4 illustrates the view of (Spatial) Negative view of the study area (Onaç Village, Çankiri, Turkey).

Base (Negative mapping of the Earth's surface): Map comprised of lines (corresponding to the cadastral parcel boundaries) indicating the spatial network as a result of drawing the spatial reference and data (FIG. 3) through land cadastral parcellation (FIG. 2). Same base produced on acetate or in digital medium is used in detecting stamps and layers of a study area (FIG. 4).

Geostamp: Motif in various type, scale, and shape having meaningful and different themes drawn through lines on the base.

Figure 6:
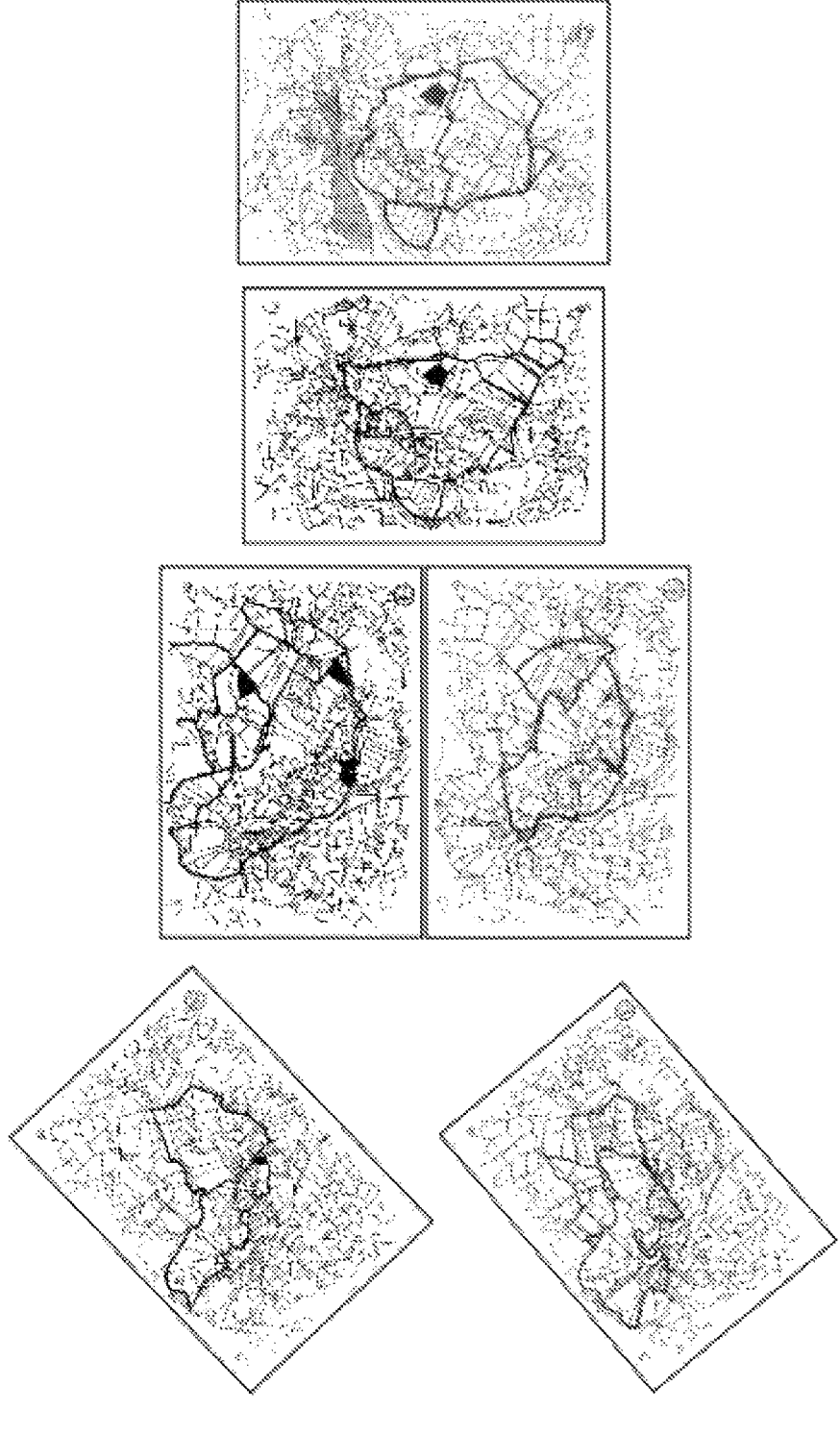
FIG. 6 illustrates the view of geostamp, motif, and pattern samples in the study area (Onaç Village, Çankiri, Turkey).
Figure 7:
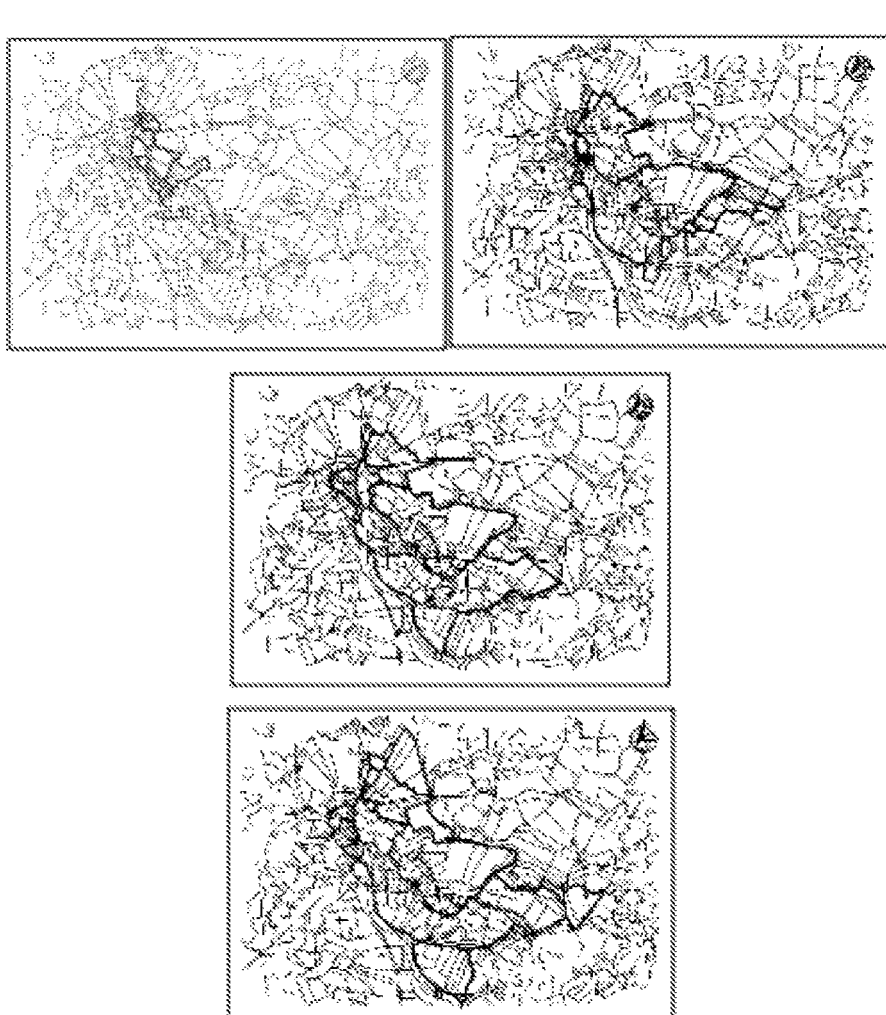
FIG. 7 illustrates the view of the layer samples in the study area (certain layer motifs of Pigeon King, Hittite period).

Layer: Layer; is each base copy as a sheet, wherein stamps are processed manually (by hand) or in a digital medium. Geostamp motifs and patterns constitute single or multiple original compositions on each layer (FIG. 6, 7, 9, 10, 11, 12). Layers are overlapped.

Figure 5:
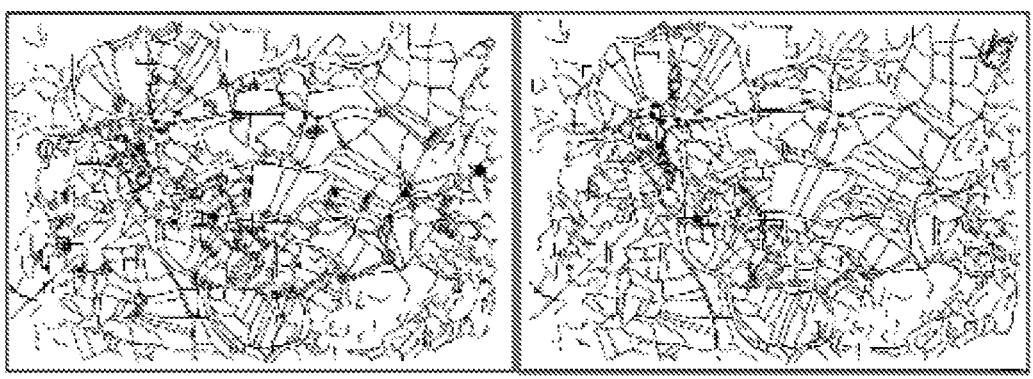
FIG. 5 illustrates the view of the details and drawing reference detail, polygon, triangulation points, triangulation periphery, and origin of the cadastral parcellation of different civilizations.

Reference Drawing Detail: Drawing detail is the detail defining the drawing method (morphology) of the civilization, which is used in appliqueing the shape of the cadastral parcel (FIG. 5). Stamps are appliqued to the land by a different detail at every civilization period. For example; heading to three different directions from a single point (triangulation point), extending two lines rightwards and a single line leftwards on a single line, and having zigzag motif drawing detail.

Polygon: Each one of the points, which follows one and other and at which measurement is taken, on the straight line from the triangulation point being the reference for the measurement in measuring the land to the other triangulation point (FIG. 5).

Figure 9:
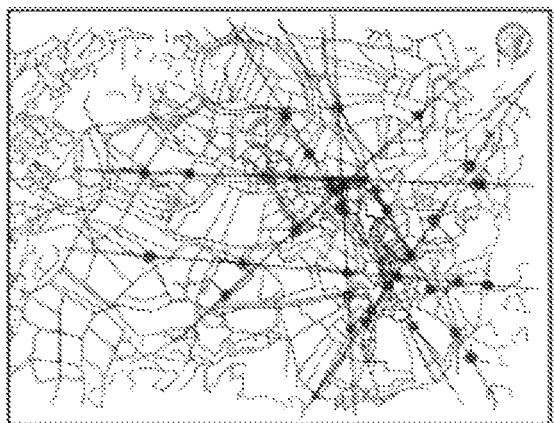
FIG. 9 illustrates the view of motif positioning and triangulation points, polygons, and motif lines on the study area.
Figure 10:
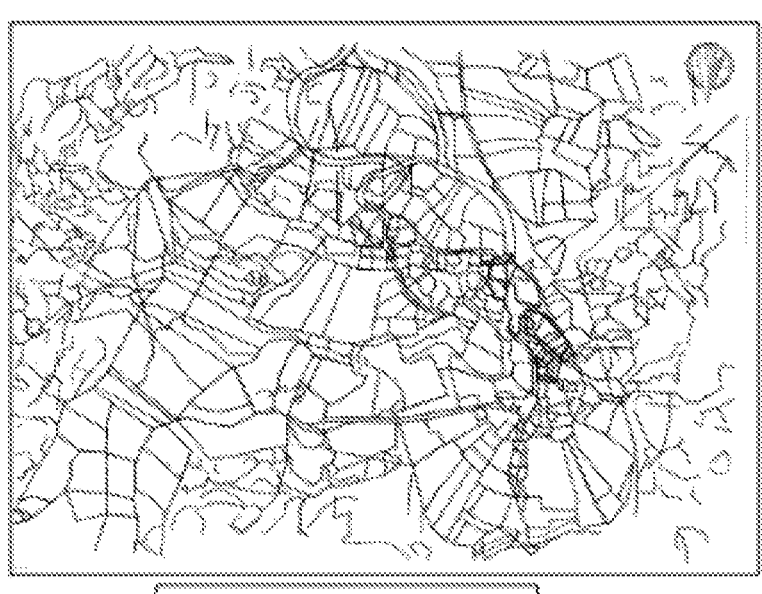
FIG. 10 illustrates the view of the base direction and the motif on the study area.
Figure 10:
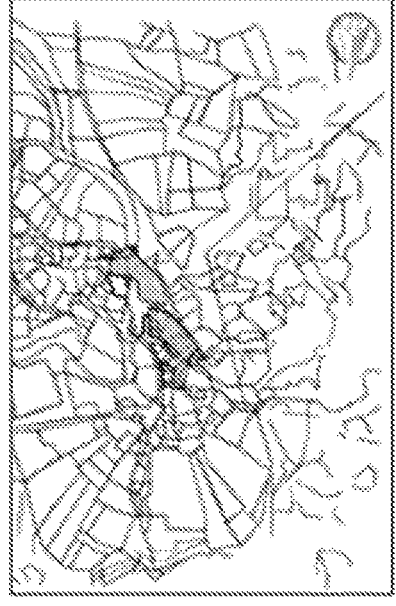

Triangulation Point: Point is considered as a hill so as to detect the location of a certain number of points in a significantly accurate and precise manner. This point regarded also as reference for calculating the land by way of triangulation thereof is an initial departure point for starting measurement of lines used in the drawing process of a motif (FIG. 9).

Figure 8:
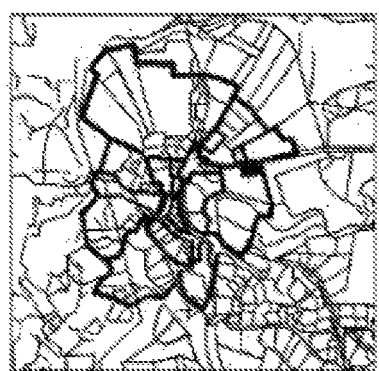
FIG. 8 illustrates the view of a key-shaped sample in the study area. (Onaç Village, Çankiri, Turkey).
Figure 8:
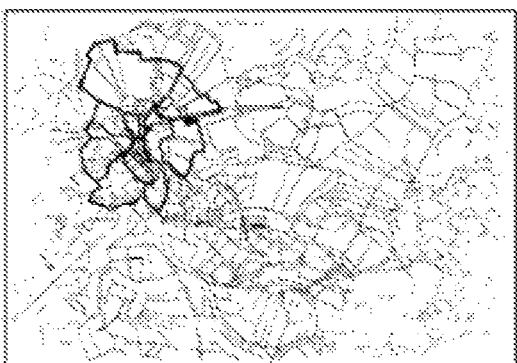

Key Figure (Key Motif): The most meaningful motif on the cadastral pattern that allows detecting of geostamps on a geographical area. It also makes other motifs visible once it is drawn (FIG. 8).

Motif: Each of the elements that constitute visually meaningful figure integrity on its own and conformity, pattern integrity with a unity and picture composition, when brought side by side (FIG. 6, 7). Motifs are drawn through a method, which arrives at the initial point again. They are used as a symbol of its civilization.

Figure 11:
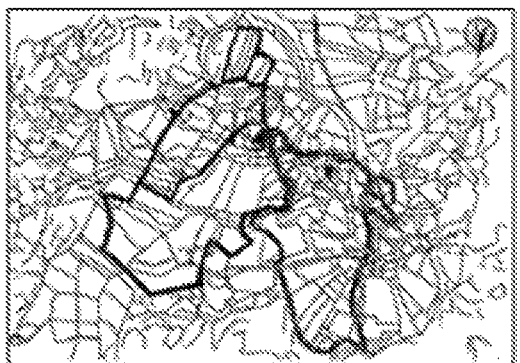
FIG. 11 illustrates the view of the pattern sample on the study area (Clash with the Goat, Onaç Village, Çankiri, Turkey).
Figure 12:
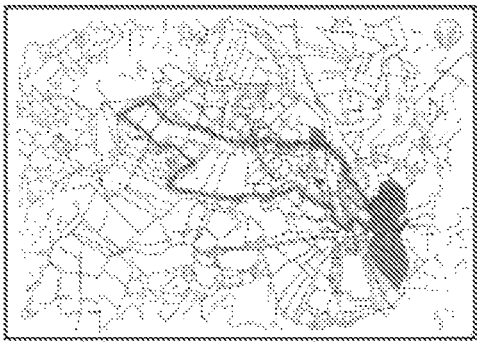
FIG. 12 illustrates the view of the pattern sample on the study area. (Disease, (probably malaria), a snake coming from the stream direction, Hittite period, unscaled. 2016. (Onaç Village, Çankiri, Turkey)

Pattern: Integrity of meaningful figures that are drawn on land indicating themed unity of stamp motifs (FIG. 11, 12).

Design Principle: Drawing principles used for creating figures of the motifs of that civilizations (such as Stairs (zigzag) system, distributing to three different directions from the triangulation point, causing motion perception on different successive layers, heads facing opposite directions—overlapping with each other—combined—situated side by side, animal-themed motifs, motifs oppositely in the same alignment and size). Abstraction, sectional representation, picturing at various angles (search for 3-D), and/or kaleidoscopic effect are some of the drawing principles.

Composition: Unity of themed motifs and/or patterns on a layer.

Stamp Texture: Layers forming land registers of the civilizations by means of cadastral and geographical structure threshold, and spatial reference lines as a result of bringing bases side by side that define the geographical area on the Earth's surface.

Triangulation Frame: Geometrical figures (square, circle, triangle, rectangle) drawn on land to calculate and locate the origin. It is a closed line system.

Origin: Geometrical center of the triangulation frame. The point, on which all measurements are based upon.

The inventive method used in outputting a layer catalog in the atlas format including maximum numbers of geostamps and layers specific to a certain area comprises the following steps;

drawing the Earth's surface (geographical structure; spatial reference and data) and land cadaster parcels on a geographical area that will be the study area and negative mapping of the study area–the land (forming the base), copying the negative map, forming different layers by way of using basic design principles and knowledge of the art of painting, and according to direction, form, correspondence, proximity, ratio, proportion, shape, measure, and scale, starting from the key figure, drawing of geostamps, patterns, pattern compositions, and reference drawing details on the copied negative map, in other words on the base copy, determining geostamp morphologies of the civilizations, forming layers by means of recording the drawn layers on the base conducted in a digital medium without classification and outputting based on its sizes, performing the classification of the motif/pattern similarity, motif enlargement, base direction and angle of the layers formed digitally or manually, conducting the follow-up order, correcting the pattern and the motif, adding the missing layers, and also correcting the layer order, scanning and ordering of the layers produced manually and printing the scanned and ordered layers, correcting the pattern and the motif, adding the missing layers and performing the layer order correction, preparing identity card (location name/code) based on the layer order, and issuing the layer order number, introducing the north sign, preparing the location identity card (location name/code) based on the layer order produced in the digital medium and issuing the layer order number, introducing the north sign, saving with a different name and printing the layers, performing the cataloging process, copying thereof by means of printing and archiving the catalogs prepared manually or in the digital medium and simulating the layering process.

In the preferred embodiment of the inventive method, the catalogs which are issued manually and/or produced in the digital medium are printed or copied. Catalog output in the atlas format achieved by means of the inventive method may be transferred to a relational database management system or any cloud system. A simulation is achieved by means of performing the layer ordering by a film-stripwise logic in the inventive method.

In a preferred embodiment of the present invention, a geographical area with a significant cadastral parcel unity is used in performing a negative mapping of the land. This area is composed by parcel lines constituting the land cadaster order and geographical structure, which is not deteriorated due to factors such as urbanization, industrialization, agriculture, etc. Subsequent to the determination of the study area, "suitable to National Coordinate System Country Scale", it is formed the negative map (the base) on a study sheet drawn on an acetate and/or by using geographical information system technologies and saved in the digital medium by means of communicating with a device preferably outputting the scaled cadastral information of the area and the fundamental lines of its geographical structure. It is drawn the cadastral data with the parcel texture comprised of lines of the parcel boundaries and tree row, rock area boundary, river line, and basic lines of the geographical structure. Geographical information systems are programs based on orthophoto mapping, satellite mapping, cadastral mapping or planning information system (PIS) or CAD software.

The base (negative map) formed is produced as a ground in various scales, ranging from an A4 page to a map sheet format. Furthermore, the negative map may be produced without scale, in scales of $\frac{1}{200}$, $\frac{1}{500}$, $\frac{1}{1000}$, $\frac{1}{2000}$, $\frac{1}{5000}$, and $\frac{1}{20000}$ or greater scales. In the production of the negative map, it is used the images of the selected area from Google Earth® and cadaster information system data or geoimages integrated with the cadastral system data.

It is copied by means of the transparent base photocopy method or hand-drawing method with scale or without scale, and it is also copied by means of other recording and/or printer/plotter printing method, if it is a digital base, so as to form the base copy for manual studies in the inventive method. Not only is the base output photocopied or printed in the detection of the geostamps but also every stamp layer may be copied by means of drawing in a separate acetate in the multiple base formation. It can be formed the base on "Google Earth®" program images. In such a case, except those belonging to the modern period, all lines (of the geostamp) are drawn on the image and are saved in a file.

In a preferred embodiment of the method, stamps, patterns, and pattern composition determined by using the basic design principles and knowledge of art of painting achieved, as a result of examining the base produced particularly for that geographical area are examined from different directions and angles, are manually processed to the base copy issued manually or in the digital medium. Said process is performed in the digital medium and/or manually. In a further preferred embodiment of the present invention, it can be ensured to draw manually the base copy and stamp simultaneously.

In the preferred embodiment of the method, shape changes of motifs and figures are defined through drawing reference details, polygon and triangulation points of the stamps and their origins based on the determination of triangulation and reference perimeters, and identification of the layers of the geostamps are made. The figure growth and transformations in the shape changes of motif and patterns are determined.

In the inventive method, the lines of the base defining the motif should be drawn, and different colors for each motif should be used in the manual and digital drawings for the purpose of the period and representation differentiation of the motifs. Drawing the parcel line is performed through pens with tip sizes of 1 mm-2 mm in small and medium sizes of motifs and through pens with tip sizes of 2 mm-3 mm-4 mm in large size of motifs.

In the inventive method, the relation of motifs in the layer is questioned as well as the vertical relation between layers and the motifs and patterns are processed. Said process is performed in the correction step. Thus, the development and transformation of the pattern may be completed.

In the inventive method, the base direction based on the base edge, on which the geostamp motifs are seated is determined and classified.

In the preferred embodiment of the present invention, stamps, patterns, and pattern compositions determined, as a result of examining the base produced particularly for that geographical area from different directions and angles, are drawn on the digital base by means of appropriate programs in the computer medium. In the preferred embodiment, motif compositions of geostamps on every layer are processed in the digital platform by means of various formats, datum, and projection systems, printed, ordered in line, and corrected. Formats may be Arc/Info, ArcView, DXF, DGN, TIFF, DTED, VPF. Datums may be ED-50, ED-90, WGS-84. Projection systems are one of UTM, Lambert, Geographical Information Systems. After processing the motif composition of the geostamps, carollage is implemented on the digital platform, and the geostamps found are processed based on the map coordinates.

In the inventive method, the layers prepared in the digital medium are saved in an unclassified manner after processing the geostamps to the map coordinated layers. Geostamps, motifs, and/or patterns drawn are processed to the base prepared in Geographical Information System (GIS) and afterward, saved in the file determined according to the base direction with a different file name, thus the unclassified save is performed. In a further preferred embodiment, a file is opened in the program "Google Earth" and stamps are drawn one by one.

In a further embodiment of the inventive method, on each layer produced manually, the north sign is also manually pressed on the upper right corner of the base such that it indicates the north direction of the field and relative to the base direction (coordinates x and y) of the geostamp. In the sheet and map sheets prepared by using computer programs being a further preferred embodiment, the north sign is formed on the upper right corner of the layer based on the base direction of the stamps as an advantageous feature of the computer program, such that it indicates the north direction of the field.

In the inventive method, after forming the north direction on the layers, scanning the layers drawn manually is performed and it is saved digitally under a file named according to the base direction. At every stage of the inventive method, it can be performed the motif and layer correction.

In the preferred embodiment of the present invention, the layers prepared manually are scanned in color preferably in the minimum "300 dpi" or ".tiff" format after the steps of scanning, unclassified save, and correction of the layers. After the scanning process, they are registered in an unclassified manner with different names under the main file opened based on the base direction. After the saving process, all layers in the digital medium are printed.

In the inventive method, saved and printed layers prepared manually or in the digital environment are classified based on the motif and pattern similarity, base direction, and the layers classified relative to base direction are classified on the basis of stamp morphology. In the method, layers are ordered based on the figure similarity of the patterns formed by the unity of a motif with other motifs, on positioning the motif relative to the base, and also on the enlargement direction and transformation. In this process, the design principle of different civilizations is used for evaluating the reference drawing detail, motif, pattern, and pattern compositions, and thus, it is formed a historical index by means of its ordering.

In the inventive method, the ordering process is comprised of three steps, wherein layers are ordered manually based on the base direction and motif similarity and enlargement at the first stage. It is printed the digital layers, which are registered in an unclassified manner. The ordering is carried out in a wide area and further, during the processing, it is performed by suspended layering or layer placement horizontally. The first ordering process comprises ordering of the layers directly scanned after the layer detection in MS Office Word® in the digital medium in the base direction or by way of using a different software program, such that there are preferably two layers on a sheet. Layers drawn and scanned manually are ordered by the same program.

The second step of the ordering process is a process for correcting the order. It is printed the layer order prepared by using MS Office Word® through which the scanned layers are processed or by using different software, the layer location and pattern/motif control are checked, and based on the correction stamps are re-ordered in the digital medium. Word®, through which the layers are processed, allows for ordering of two hundred stamps in total on a maximum of one hundred sheets, such that there are two layers on a sheet. It is appropriate for ordering to use a configured version of Word® program, enabling two or three layers on each sheet based on the layer direction, and five thousand stamps in total on a maximum of two-thousand sheets, and more.

The final and third step of the ordering process is the final correction. The layers ordered in the second step are printed and they are re-ordered, and subsequently, the motif, pattern, and layer corrections are carried out. Correction processing is carried out on the copy printed on the layers prepared manually. Correction processing in the digital medium is performed in the file registration order and its names, and layer motifs and patterns. Original drawings are drawn and corrected manually or in the computer medium in case of demand for the correction processing, the corrected copy is re-scanned and the previous register is amended.

In the inventive method, the ordering process is performed once in studies with few layers, and more than three in studies with multiple layers.

In the inventive method, in the step of determining the geostamp morphologies of civilizations, is defined based on drawing and design principles of the geostamps, the drawing technique that can be scale, theme and direction, reference drawing detail and land application details that can be the triangulation point reference. Stamps of a civilization having existed in various geographies exhibit the same drawing principle and detail. In the inventive method, the layers having the same morphology are considered belonging to the same civilization and it is determined which civilization this is, based on the archaeological, historical, geographical, and historical geography knowledge about this land. In the preferred embodiment, it can be detected how long a civilization stayed on the land, based on the number of layers with the same morphology, wherein this step is optional. Said step may be performed before the cataloging process so as to shorten the study period and to allow other crews to study.

In the inventive method, the layer correction and printing process is performed after determining the geostamp morphology of the civilizations. The layer correction and printing process is the last check of the layer order, wherein it is corrected the follow-up order of the layers, motif and patterns on a layer or details and/or the missing layers are added. In the inventive method, the layers, which are manually processed, scanned, and ordered in the digital medium are printed, and afterwards, they are corrected. Layers prepared in the digital medium and ordered by being subjected to the printing are re-organized in the computer registers based on this order. After the correction processing performed manually and/or in the digital medium, the corrected copy is printed by means of carrying out the necessary corrections in the layer motifs and file registration name/code and numbers.

In the inventive method, the copies are named and numbered after the steps of correcting the follow-up order of the layers, motif, pattern, and composition on a layer or details or introducing the missing layers, afterward printing the layers. Location name/code and layer order number are appointed manually to the layers ordered manually over the last copy printed and to the layers prepared in the digital environment by way of saving in other files or by means of a particular software program. In said step, the location name/code and layer number appointed to the layers ordered manually is processed to its correspondence in the digital scanning and ordering file. In the preferred embodiment, it is optional to appoint numbers to motifs and patterns. In the inventive method, the naming processing is performed based on the base direction and the detecting of the morphology and in the process of determining the morphology of the geostamps, according to name/code of the civilization if it matches any civilization In the inventive method, the location name/code and layer order number are given to the copies resulting from the printing process and it is performed the atlas output cataloging and reproduction process. The final print achieved in this step is comprised of layers with a maximum number of geostamps. In the inventive method, the cataloging process is performed in two ways. One of them is manual and the other is the digital cataloging process. Layers in the sheet and map sheet format ordered and numbered after drawing manually the geostamps through the manual cataloging or the layers in the sheet or map sheet format scanned, ordered, and numbered of the manually drawn layers constitute the entirety. Manual cataloging is featured as codex or origin atlas. In said step, layers that are not transferred to the digital medium are cataloged, such that they are ordered in a unity, given an order number, and location/name information is processed with the north sign. In other words, in the inventive method, it is achieved the Atlas origin being the catalog comprised of only the printed layers and original drawings in case the scanning is not performed.

In the digital cataloging process, the layers are layers prepared and ordered by way of using every sort of land modeling, software, Geographical Information System (GIS) and drawing programs or geospatial data systems or in the standard computer medium.

In the inventive method, layers produced manually and in the digital medium are printed in a resolution of at least 300 PDI and .tiff in sheet or map sheet format. Atlas origin can be multiplied through photocopying. In this stage, the atlas origin may be multiplied by means of scanning.

In the inventive method, the achieved output product may be transferred to a relational database management system such as Microsoft SQ1®, Oracle Database® processed in a computer or Geographical Information System (GIS) or to a service provider area (e-archive) in any cloud system. An archive that can be used as a database may be kept in a central database formed on an operating system such as a particular image database system (Extensis portfolio) or various geographical databases (ESRI, ArcGIS, QGIS, OpenGIS, etc.). Thus, it keeps all layer information and information and data in different formats, such that they can be integrated with other areas.

Furthermore, in the inventive method, the layers are ordered film stripwise, and thus, it is simulated the history of the respective geographical area. The simulation process can be performed subsequent to the naming and numbering of the final printed copy or simultaneously.

The atlas achieved through the inventive method may be employed in the industry and service sector. Said atlas can be produced with a particular scale or without scale, being specific to a certain geographical area, since it is a technical and technological production unity. The output product achieved through the inventive method may be employed in archeology, spatial planning, history, urban archeology, settlement archeology, urbanization history, historical geography, cartography studies. The inventive atlas may be employed in defining land registers, dominance geography, and cultures, people, beliefs, and experiences of the ancient civilizations. The output of the inventive method may be demanded by a natural and legal person or institutions and governments tracing the civilizations. It can be granted the license to other institutions and organizations for the purpose of production.

By means of the inventive method, it is performed a negative mapping of the area comprising a maximum number of geostamps drawn on the land by means of the pictography method and by way of shaping cadaster parcels and earth's surface, detecting the geostamps by using design principles and knowledge of the art of painting in a layered manner, determining the morphology differentiation in the stamps and ordering and printing the layers and then achieving a production output comprising all layers, so as to reveal histories, spatial dominance lands, settlement lands, and administrative control borders and land registers of the ancient civilizations once having existed in a certain geographical area. The output product achieved through the inventive method is an atlas which is a layer catalog output that comprises geostamps and layers specific to a certain geographical area and is produced manually or in the digital medium in the book or map sheet pile format. In the inventive method, E-archive or geo-archive comprising the database of the geostamp layers and stamp texture, determining the stamp morphology and forming a simulation and sharing with the public may be optionally provided.

In the inventive method, it is determined the land cadaster parceling lines, reference detail, polygon and triangulation points, and triangulation references used in drawing the lines over the negative of any land, thus achieving the outputs constituted by the layers comprising geostamps, motifs, pattern, and composition.

It is possible to develop various implementations of the output preparing method used in producing the layer catalog of the geostamps in the atlas format, and the present invention cannot be limited to the examples provided herein, but it is mainly as in the claims below.

The invention claimed is:

1. A method used in reading geostamps and outputting a layer catalog in an atlas format, the atlas format having the geostamps and geostamp layers specific to an area, the method comprising:

drawing geography and land cadaster parcel lines on a geographical area that will be a study area, the geography being a geographical structure or a spatial reference and data;

performing a negative mapping of the study area so as to form a base;

copying the negative mapping so as to form a base copy;

forming different layers of geostamps based on at least one of a direction and a form and correspondence and a proximity and a ratio and a proportion and a shape and a measurement and scale starting from a key of the geostamps and patterns and pattern compositions and reference drawing details on the base copy so as to form drawn layers;

determining geostamp morphologies of civilizations in at last one of the drawn layers, the geostamp morphologies of civilizations being a classification of every geostamp relative to the civilizations as geostamp characteristics differ by each civilization that creates the geostamp;

forming layers of geostamps by saving the drawn layers on the base conducted in a digital medium without classification and printing based on a size of the base as to form saved layers;

performing a classification of the saved layers of the geostamps formed digitally or manually based on at least one of a geostamp motif or pattern similarity and a motif enlargement and a transformation relative to a base direction of the base and an angle of the base and conducting follow-up ordering and correcting the geostamp motif and reading and adding missing layers to a line-up order and also correcting an order of the layer;

scanning and ordering of manually produced saved layers followed by printing the scanned and ordered layer and correcting the pattern and the motif of the geostamps and reading and adding the missing geostamp layers to the line- up order in order to perform layer order correction and preparing identity cards based on the layer order, issuing a layer order number and introducing a north arrow sign, the identity cards having a location name and code and layer order number;

registering with a different name and printing the layers;

performing a cataloging process and copying by printing; and archiving the catalogues that were prepared manually or digitally and simulating a history of the respective geographical area by layer delamination.

2. The method of claim 1, further comprising:

printing or copying the catalogs produced manually or digitally subsequent to the cataloging process, the printing or copying being transferred to the digital medium after producing manually or directly prepared in the digital medium.

3. The method of claim 2, further comprising:

transferring a catalog output in the atlas format to a relational database management system or cloud system.

4. The method of claim 1, further comprising:

achieving a stimulation by ordering the layers stripwise.

5. The method of claim 1, further comprising:

forming the negative map on a transparent film or digitally by using a geographical information system technology and by communicating with the device that outputs scaled cadastral line information of the area and fundamental lines of geographical structure subsequent to the determination of the study area based on a national coordinate system country scale, the negative map being the base.

6. The method of claim 1, further comprising:

copying by means of the transparent film by photocopying or hand-drawing on the transparent film with the scale or without a scale so as to form a base copy adapted for manual study.

7. The method of claim 1, further comprising:

manually processing geostamps, patterns and pattern compositions determined by basic design principles and knowledge in painting resulting from examining the base produced for the geographic area from different directions and angles to a horizontal base copy issued manually or digitally.

8. The method of claim 1, further comprising:

defining changes of shape of the motifs and patterns through drawing reference details, polygonal or triangulation points of the geostamps and origins thereof based on the determination of triangulation points and reference perimeters, and identifying the geostamp layers.

9. The method of claim 1, further comprising:

drawing parcel lines defining the motifs and using different colors for each motif so as to differentiate a period and a representation in the motifs;

questioning a vertical relationship between the layers; and processing the motifs and patters and the relationship of the motifs in the layer.

10. The method of claim 1, further comprising:

defining the base direction depending on the base on which are seated on the geostamp layer and the classification thereof;

digitally rendering the geostamps and patterns and pattern compositions derived from multiple directions and angles in a horizontal position onto a digital base via a software program; and processing, printing, ordering and correcting composition of the motifs of the geostamps on every layer in the digital platform by at least one of various formats and datum and projections.

11. The method of claim 1, further comprising:

manually pressing the north arrow sign on an upper right corner of each layer produced manually based on the base direction of the geostamp so as to indicate a north direction of a field.

12. The method of claim 1, further comprising:

forming the north arrow sign on an upper right corner of the layer based on the direction of the geostamps onto a map sheet so as to indicate a north direction of a field.

13. The method of claim 1, further comprising:

color scanning the layers prepared manually in either a minimum 300 dpi or.tiff format so as to an unclassified save and correcting the prepared layers;

registering the scanned layers in an unclassified manner with different names under a main file opened based on the direction of the base after the scanning; and classifying the layers printed after the step of registering based on a similarity of the motifs and classifying the layers based on the direction of the base and geostamp morphology.

14. The method of claim 1, further comprising:

ordering the layers based on a figure similarity of patterns resulting from a unity of the motifs on the positioning of the motifs depending on the base and on a direction of enlargement and transformation; and manually ordering layers based on the direction of the base and the similarities of the motifs and enlargement at a first stage, the step of ordering comprising:

performing as a first step a first ordering of the layers directly scanned after the detection of the layers in MSOfficeWord (TM) in the digital medium in the direction of the base so as to have multiple layers on each sheet; and printing a layer order as a second step of the layers by which the scanned layers are processed in the first ordering and checking layer a location and the motif and re-ordering stamps based on the correction of the digital medium; and printing the layers as a third step and reimplementing the ordering process and carrying out motif and layer corrections.

15. The method of claim 1, further comprising:

defining the geostamp morphology of the civilization based on the drawing and the design principles of the geostamps, wherein a drawing technique is one of a scale and a theme and a direction, wherein land application details are in a reference drawing detail and a triangulation frame in the step of determining the geostamp morphology of the civilization.

16. The method of claim 15, further comprising:

preforming the correction of the layers and printing process after the step of defining the geostamp morphology of the civilization;

naming, numbering and signing the copies giving an identity card to each of the layers after the step of correcting the follow-up order of the layers, and motif, pattern and compositions on a layer or detail thereof or introducing missing layers, and printing the layers, wherein the identity card has a location name and a code and a layer order number thereon; and giving an identity card having the location name or code and layer order number to the copies resulting from the step of printing and performing an atlas output cataloging and copying.

\* \* \* \* \*